L. L. MELTON & H. R. WHOMES.
MOTOR VEHICLE.
APPLICATION FILED MAY 4, 1917.
1,271,053.
Patented July 2, 1918.
3 SHEETS—SHEET 3.
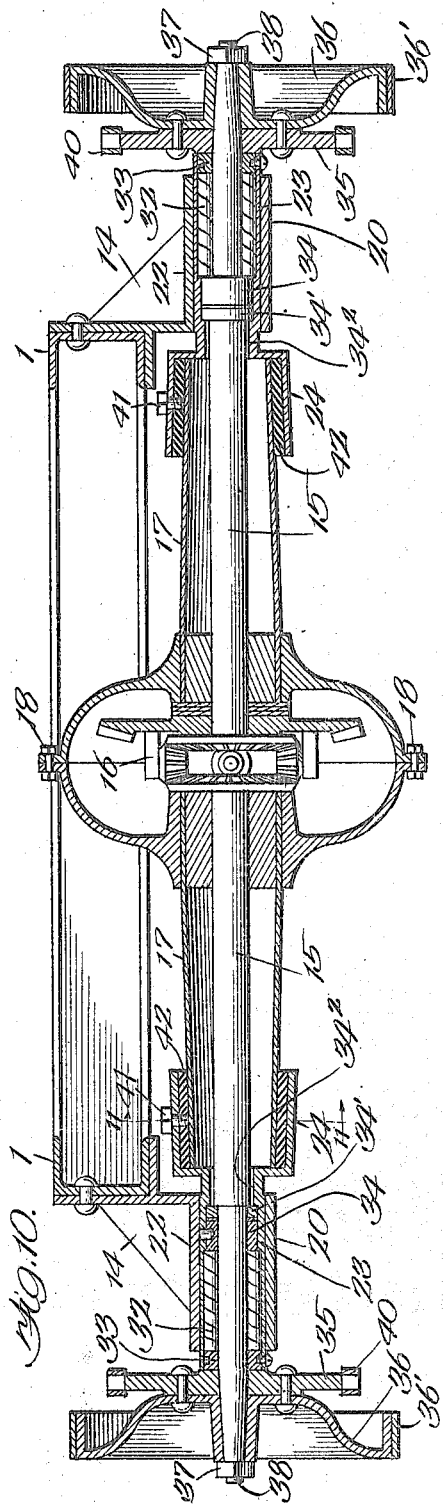
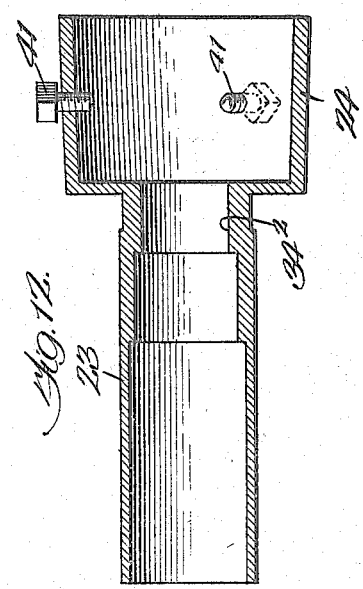
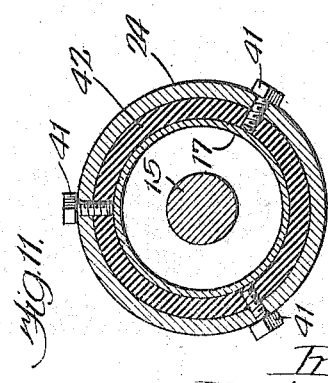
Inventors.
Lloyd L. Melton.
Harry R. Whomes.

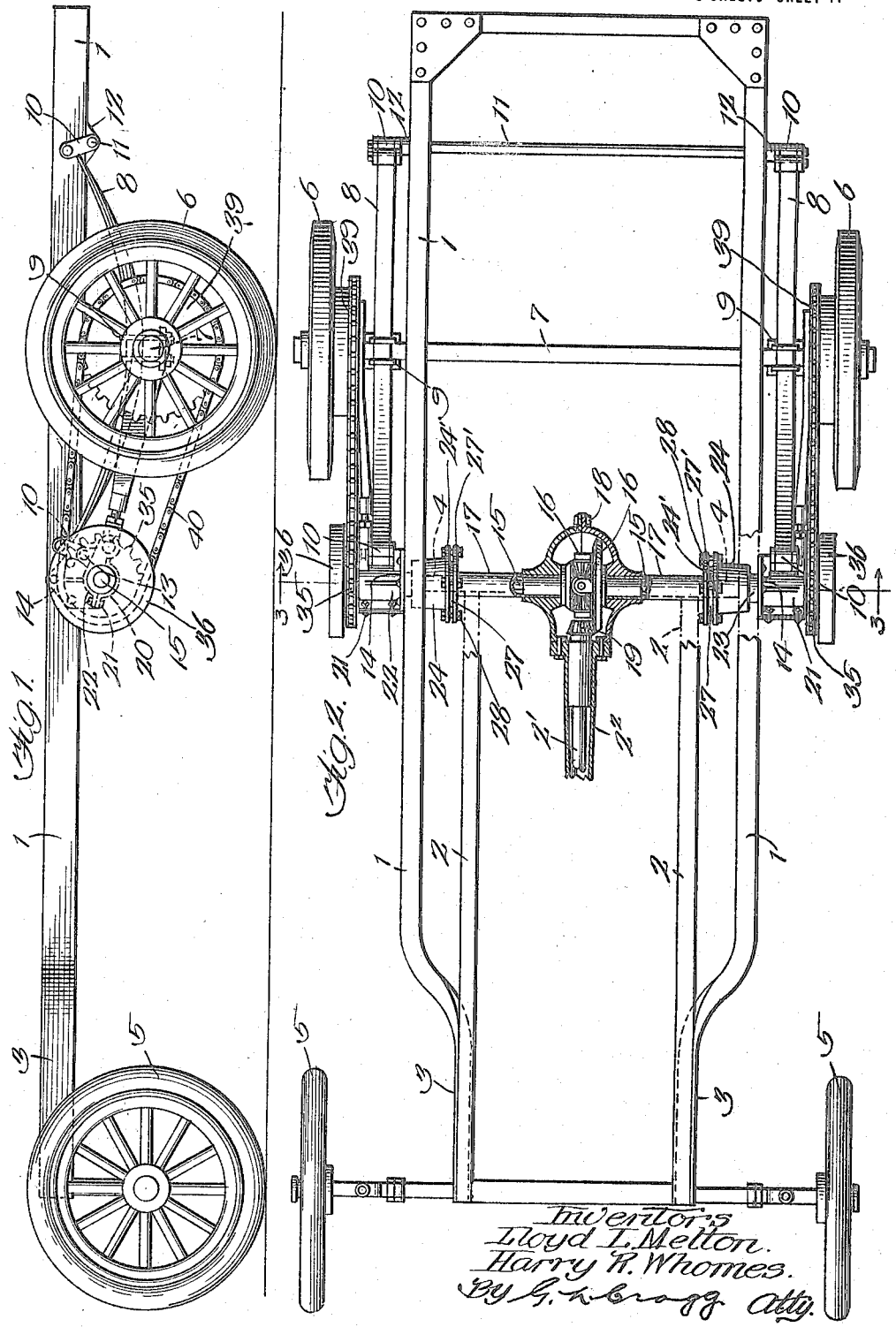

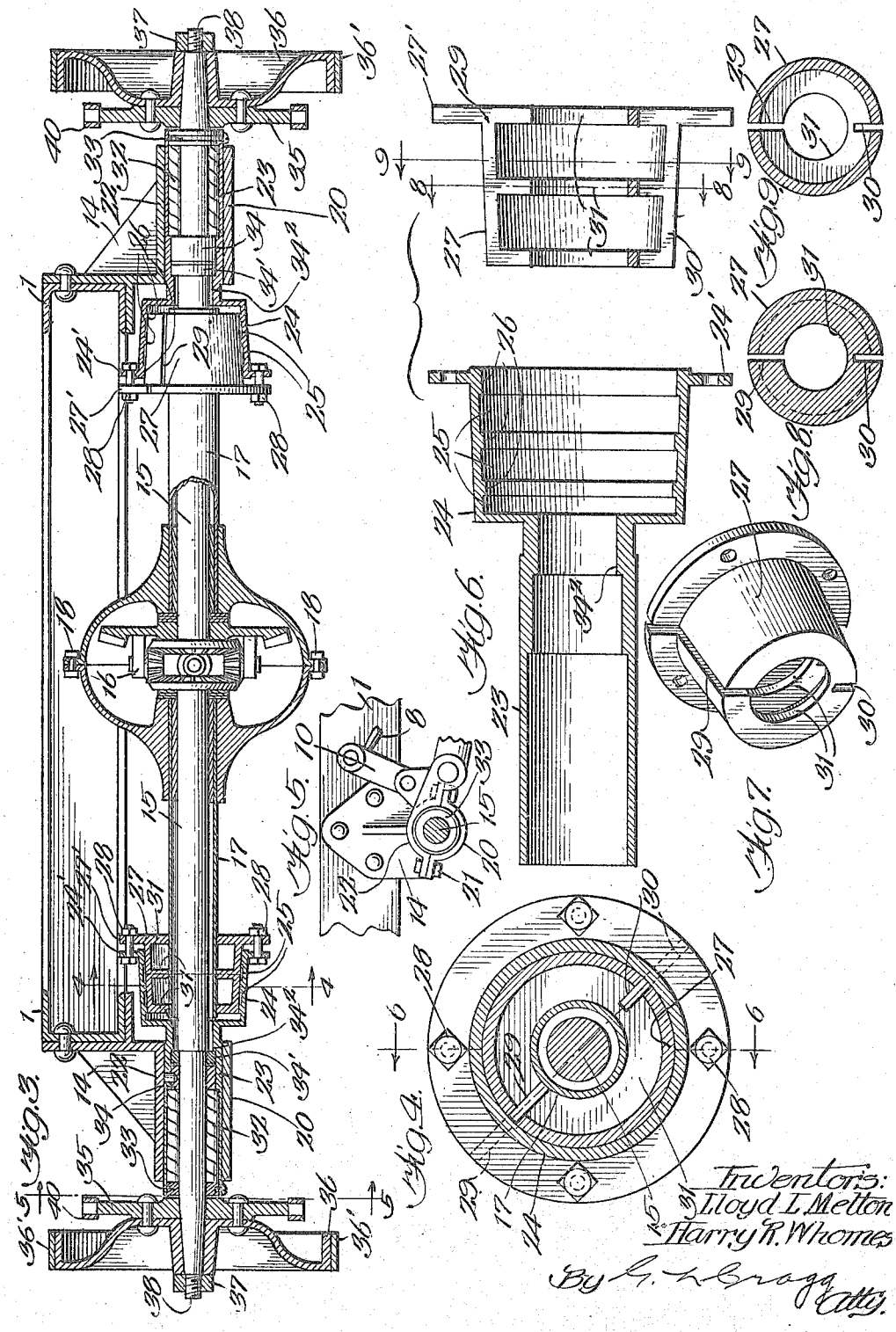

UNITED STATES PATENT OFFICE.

LLOYD L. MELTON AND HARRY R. WHOMES, OF CHICAGO, ILLINOIS, ASSIGNORS TO DEARBORN TRUCK COMPANY, OF CHICAGO, ILLINOIS, A CORPORATION OF ILLINOIS.

MOTOR-VEHICLE.

1,271,053.   Specification of Letters Patent.   Patented July 2, 1918.

Application filed May 4, 1917.   Serial No. 166,438.

*To all whom it may concern:*

Be it known that we, LLOYD L. MELTON and HARRY R. WHOMES, citizens of the United States, residing at Chicago, in the county of Cook and State of Illinois, have invented a certain new and useful Improvement in Motor-Vehicles, of which the following is a full, clear, concise, and exact description.

Our invention relates to motor vehicles and has for its object the provision of improved means whereby automobiles may be converted into motor driven vehicles (such as trucks) operating at higher power with lower speed. Our invention resides in improved means whereby the rear axles of automobiles are converted into jack shafts that are in gear connection with the driving vehicle wheels, the jack shafts desirably carrying sprocket pinions while the rear driving vehicle wheels desirably carry sprocket gears that are driven by the sprocket pinions by sprocket chains. We desirably employ supplemental bearings for the jack shafts and we also desirably employ supplemental housing sections that surround the supplemental bearings and means for positioning these bearings and supplemental housing sections in relation to the housings originally surrounding the jack shafts and in relation to the jack shafts themselves. We do not limit ourselves to sprocket gears and chains.

We will explain our invention more fully by reference to the accompanying drawings showing preferred embodiments thereof and in which Figure 1 is a view in side elevation of a motor truck equipped in accordance with our invention; Fig. 2 is a plan view of the structure illustrated in Fig. 1, parts being broken away and other parts being shown in section; Fig. 3 is an enlarged sectional view on line 3—3 of Fig. 2, the retained portion of the original chassis frame and the means by which it is attached to the supplemental or added frame being omitted for the sake of clearness; Fig. 4 is an enlarged sectional view on line 4—4 of Fig. 3; Fig. 5 is a view on line 5—5 of Fig. 3; Fig. 6 shows some of the parts that are illustrated in Fig. 3 in separated and changed relation; Fig. 7 is a perspective view of one of the parts shown in Fig. 6; Fig. 8 is a view on line 8—8 of Fig. 6; Fig. 9 is a view on line 9—9 of Fig. 6; Fig. 10 is a view illustrating a modification, the retained portion of the original chassis frame and the means by which it is attached to the supplemental or added frame being omitted for the sake of clearness; Fig. 11 is a view on line 11—11 of Fig. 10, on an enlarged scale; and Fig. 12 is a view, on a larger scale, of one of the parts illustrated in Fig. 10.

Like parts are indicated by similar characters of reference throughout the different figures.

The attachable supplemental frame 1 may be of any suitable shape and construction. The original or main frame 2 of the original chassis may or may not be shortened to suit circumstances and if shortened the rear end thereof is removed to the desired extent. The supplemental frame 1 is generally but not necessarily wider than the original frame 2, the side rails of the supplemental frame being bent at the forward end as indicated at 3, the supplemental frame 1 and the original or main frame 2 being bolted or riveted together at their forward ends. Whether the original frame 2 is shortened or not it is provided with lateral extensions 4 at its rear end if the supplemental frame is wider, the outer ends of these lateral extensions being riveted or bolted to the side members of the supplemental frame 1. The steering vehicle wheels 5 may be the wheels which belong to the original chassis or they may be other wheels substituted for the original steering vehicle wheels. With the possible exception of the replaced steering vehicle wheels we retain substantially all of the original chassis inclusive of its power plant excepting some of the housing for the original rear axle and the rear axle bearings in this housing, the rear vehicle wheels and, (in the event that the original frame 2 is shortened) the removed rear ends of the longitudinal drive shaft $2^1$ that is connected with the engine, the removed rear end of the housing $2^2$ and the removed rear end of the original frame 2. In most cases the outer ends of the rear axles are also cut off.

As a part of the unit that includes the supplemental frame 1 we provide a pair of propelling vehicle wheels 6 which are mounted upon an axle 7 that preferably is a non-rotating or dead axle. Springs 8 support the frame 1 upon the axle 7, these springs being desirably in the form of semi-elliptical springs which are clamped to the axle 7, in the event that such axle is a dead or non-rotating axle, by means of any preferred form of clamping devices 9. The ends of the springs 8 may be attached to the frame 1 through the intermediation of shackles 10 each attached at one end to the adjacent end of a spring 8. The rear shackles are coupled with the frame 1 by being secured to a cross rod 11 that is held in the rear brackets 12 that are secured to the frame 1. The forward shackles 10 are attached to the frame 1 by means of pins 13 which are carried by the brackets 14 that are also secured to the frame 1 and which brackets form with the frame 1 a part of the same unit that is attachable to the original frame 2. By means of the springs 8 and the parts connected therewith the frame 1 is supported upon the axle 7.

Instead of discarding the rear axle assembly of the original chassis we retain the same and employ it as a jack shaft structure in the converted vehicle. These original rear axle assemblies are generally of construction that include relatively rotatable shaft sections 15 (which are coupled by any suitable form of differential gearing 16) and a tubular housing 17 for the shaft sections 15 and the differential gearing. The housing 17 varies in different makes of automobiles, two housings of different design being illustrated in Figs. 3 and 10, the housings there shown being each formed in two sections that are united by means of bolts 18. The differential gearing 16 is in gear connection with the beveled pinion 19 provided upon the rear end of the longitudinal drive shaft 2¹.

The attachable structure that includes the supplemental frame 1 and the rear substituted vehicle wheels 6 also includes caps 20 that are semi-cylindrical (as indicated clearly in Fig. 5) and which are attached to the bottoms of brackets 14 by bolts 21, the lower sides of the brackets 14 having semi-cylindrical formations 22 that form with the caps 20 split sleeves, these split sleeves forming with the brackets 14, hangers, carried by the sides of the supplemental frame, for the shafting 15 supported in the hangers in a manner to be described.

The attachable structure which is applicable to the original frame 2 also includes supplemental housing sleeve or tubular sections 23 that are to receive the outer ends of the jack shaft sections 15, the housing sections 23 replacing the outer ends of the original housing 17, which outer ends are removed from the structure of the original chassis when such chassis and the attachable structure of our invention are to be combined to produce the converted vehicle. The housing sections 23 are clamped in the hangers 20, 22 but before being located in these hangers they are applied to the outer ends of the shafting 15 in any suitable way such as illustrated in Figs. 2 to 9 inclusive or Figs. 10 to 12 inclusive. The inner ends of the housing sections 23 have bell shaped enlargements 24 co-axial with said housing sections 23 and provided to surround the outer ends of the remaining portions of the original housing 17. The housing enlargements 24 taper conically where they surround the outer ends of the housing 17, these tapering portions being recessed at 25 (in the structure of Figs. 2, 3 and 6) to form engaging rings 26. The housing enlargements 24 are provided for the purpose of uniting the outer ends of the housing 17 with the supplemental housing sections 23 whereby these supplemental housing sections replace the end portions that were removed from the housing 17 as it existed in the original chassis. To the end that housing enlargements 24 may perform this function they are brought into clamping engagement with the housing 17 by means of the contractible collars 27 (as shown in Fig. 3) that are slipped over the outer ends of the housing 17 and are thereafter contracted into tight engagement with the housing 17 by means of the bolts 28 that pass through the flanges 24¹ and 27¹ provided respectively upon the housing enlargements 24 and the contractible collars 27. The collars 27 are made contractible by being split at diametrically opposite sides thereof as indicated at 29, 30. Parts of the collars 27 are engaged by the rings 26 and these parts are conically tapered correspondingly to said rings so that as the bolts 28 are tightened the split collars will be clamped into engagement with the housing 17. The parts of the collars 27 which engage the housing 17 are in the form of rings 31 which are completely split at 29 and are partially split at 30 to render the collars contractible under the action of the clamping bolts 28.

In the construction shown in Fig. 3 the supplemental housing sections 23 have larger bores than the original housing 17 whereby larger roller bearings 32 may be interposed between the outer and reduced ends of the jack shaft sections 15 and the housing sections 23. These bearings are desirably positioned between the rings 33, 34 that are preferably in rigid relation with the supplemental housing sections 23. End thrust rings 34¹ may intervene between the rings 34 and shoulder portions 34² in the housing sections 23. Sprocket pinions 35 are fixed upon the outer ends of the jack shaft sections 15 (that usually have their original outer ends cut off) as are also the brake pulleys 36 that coöperate in the usual way with brake bands 36¹ to check the rotation of the shafting 15 and thereby the travel of the vehicle. The sprocket pinions 35 are preferably attached to the web or spoke portions of the brake pulleys, nuts 37 engaging the threaded outer ends 38 of the shaft sections 15 to clamp the hubs of the brake pulleys (which have tapering bores) upon the tapering outer ends of the shaft sections 15. After the tubular housing sections 23 have been clamped into engagement with the housing 17 by the means described so as to be coaxial therewith and with the shafting 15 and after the elements 32, 33, 34, 34¹, 35, 36 and 37 have been assembled, the housing sections 23 are clamped within the hangers 20, 22 to be supported by the supplemental frame 1. The shafting 15, which was the rear axle in the original vehicle, now has become a jack shaft which is supported by the supplemental frame 1 of our attachable structure, which attachable structure is also inclusive of sprocket wheels 39 that are driven by sprocket chains 40 passing over the sprocket pinions 35 that drive the sprocket chains. The gear ratio between the sprocket pinions 35 and the sprocket wheels 39 is selected according to the increase in the power which the speed reducing and power increasing gearing 35, 39, 40 is to furnish.

The structure shown in Fig. 10 is generally similar to the construction shown in Fig. 3 and similar parts are given similar characters of reference. In the construction shown in Fig. 10 the housing enlargements 24 are centered upon the housing 17 by means of the clamping bolts 41 that are illustrated more clearly in Figs. 11 and 12. Linings 42 of Babbitt metal may fill the annular spaces that intervene between the housing enlargements 24 and the housing 17.

In both forms of the invention the clamping mechanism that is employed to unite the supplemental housing sections 23 with the housing 17 serves to aline the supplemental housing sections 23 with the housing 17 and coöperates with the housing 17 to maintain the supplemental housing sections 23 in fixed relation but we do not rely upon this clamping action for preserving the housing sections 23 in fixed relation as this function is also performed by the supplemental frame 1 and the hangers 20, 22 that clamp the housing sections 23 in fixed relation with the frame 1.

While we have herein shown and particularly described the preferred embodiment of our invention we do not wish to be limited to the precise details of construction shown as changes may readily be made without departing from the spirit of our invention but having thus described our invention we claim as new and desire to secure by Letters Patent the following:—

1. Means for attaching a rear axle housing of an automobile to a supplemental frame including hangers for the axle housing; supplemental housing sections carried by said hangers and having tapered enlargements which inclose the outer ends of the housing for the axle; tapered contractible collars interposed between said housing enlargements and the axle housing; means for forcing said housing enlargements into collar contracting engagement with said collars to assemble the axle housing in alinement with said supplemental housing sections; and bearings for the outer ends of the axle that are disposed within said supplemental housing sections.

2. Means for attaching a rear axle housing of an automobile to a supplemental frame including hangers for the axle housing; supplemental housing sections carried by said hangers and having enlargements which inclose the outer ends of the axle housing; means for assembling the enlargements of the supplemental housing sections and the axle housing to aline the supplemental housing sections and the axle housing; and bearings for the outer ends of the axle that are disposed within said supplemental housing sections.

3. Means for attaching a rear axle housing of an automobile to a supplemental frame including hangers for the axle housing; supplemental housing sections carried by said hangers and having enlargements which inclose the outer ends of the axle housing; contractible collars interposed between said housing enlargements and the axle housing; means for forcing the housing enlargements into collar contracting engagement with said collars to assemble the axle housing in alinement with said supplemental housing sections; and bearings for the outer ends of the axle that are disposed within said supplemental housing sections.

4. Means for attaching a rear axle housing of an automobile to a supplemental frame including hangers for the axle housing; supplemental housing sections carried by said hangers; means for assembling and maintaining said axle housing and said supplemental housing sections in alinement; and bearings for the outer ends of the axle that are disposed within said supplemental housing sections.

In witness whereof, we hereunto subscribe our names this twenty sixth day of April, A. D. 1917.

LLOYD L. MELTON.
HARRY R. WHOMES.